United States Patent [19]

Brugger et al.

[11] 4,042,672
[45] Aug. 16, 1977

[54] PROCESS FOR PREPARING CARBONATED ZIRCONIUM OXIDE HYDRATE

[75] Inventors: Wilhelm Brugger, Hosel; Ekkehard Greinacher, Essen, both of Germany

[73] Assignee: Th. Goldschmidt AG, Germany

[21] Appl. No.: 612,855

[22] Filed: Sept. 12, 1975

[30] Foreign Application Priority Data

Oct. 30, 1974 Germany .............................. 2451489

[51] Int. Cl.$^2$ ....................... C01B 31/24; C01G 25/00
[52] U.S. Cl. .................................. 423/419 R; 423/470
[58] Field of Search ................ 423/415, 471, 419, 470

[56] References Cited
U.S. PATENT DOCUMENTS 2,316,141  4/1943  Wainer ................................. 423/419
3,510,254  5/1970  Bell ..................................... 423/419
3,551,095  12/1970  Blumenthal ......................... 423/419

Primary Examiner—Earl C. Thomas
Attorney, Agent, or Firm—James E. Bryan

[57] ABSTRACT

This invention relates to a process for preparing carbonated zirconium oxide hydrate which comprises adding zirconium oxychloride . 8 $H_2O$ to a saturated aqueous ammonium chloride and/or alkali chloride solution which, based upon zirconium oxychloride . 8 $H_2O$, contains at least equimolecular amounts of ammonium carbonate and/or alkali carbonate, separating the resulting precipitated reaction product, and washing said product chloride-free with water.

4 Claims, No Drawings

PROCESS FOR PREPARING CARBONATED ZIRCONIUM OXIDE HYDRATE

The present invention relates to a process for preparing carbonated zirconium oxide hydrate by reacting a zirconium salt with ammonium carbonate and/or an alkali carbonate.

Carbonated zirconium oxide hydrate which may be expressed, for example, by the formula $$Zr_2O_3(OH)_2CO_2 \cdot 7H_2O$$

is a valuable intermediate product.

This carbonated zirconium oxide hydrate is soluble in aqueous solutions of ammonium carbonate with the formation of the ammonium salt of a carbonatozirconyl acid and is particularly valuable in this form as an aid for impregnating fibrous materials, inasmuch as this solution is stable in a neutral and slightly alkaline medium.

The product obtained from this process, while drying at 120° to 130° C, passes over into an extremely basic carbonated zirconium oxide hydrate which yields zirconium oxide during calcining at temperatures above 800° to 900° C.

Zirconium oxide compounds are also used for manufacturing optical glasses of high quality, dielectric and piezoelectric compounds, as well as for making ceramic coloring pigments, for example of the type of zirconium oxide/vanadium pentoxide/indium oxide. For these purposes, it is possible to employ either the carbonated zirconium oxide hydrate, or the extremely basic carbonated zirconium oxide hydrate obtained by drying at 120° to 130° C, or the zirconium oxide obtained during calcining at temperatures above 800° to 900° C.

for the aforementioned purposes it is necessary that the starting zirconium compound be present in a high degree of purity. According to the state of the art, carbonated zirconium oxide hydrate is made by reacting aqueous solutions of zirconium oxy- or zirconium sulfate with ammonium carbonate or an alkali carbonate, whereby an extremely voluminous gelatinous deposit of carbonated dizirconium trioxodihydroxo heptahydrate is formed. This gelatinous deposit hardly can be filtered, it envelops all impurities which are contained in the solution and, because of its gelatinous condition, it also does not lend itself to being washed chloride-free. But it is precisely the removal of impurities and the removal of the chlorides that are of particular importance for the further utilization of the product obtained from this process.

It is the object of the present invention to eliminate the disadvantages of the state of the art outlined hereinabove.

According to the present invention, it surprisingly has been found that zirconium oxychloride · 8 H$_2$O can be introduced into a saturated aqueous ammonium- and/or alkali chloride solution which — based upon zirconium oxychloride · 8 H$_2$O — contains at least equimolecular amounts of ammonium- and/or alkali carbonate, the precipitated reaction product is filtered off, and washed chloride-free with water.

The moist crystals obtained may be directly dissolved in this form in ammonium carbonate-containing water, and the solution then may be utilized in the textile industry, as described above. Drying of the crystals obtained is not necessary. If it is desired, however, to remove the residual moisture, this must be done under very careful coditions, for example by passing a CO$_2$ current over the moist crystals at 20° C. If the carbonated zirconium oxide hydrate is intended to be employed for making coloring pigments or other products in which either the product or the product mixture is calcined, the removal of the residual moisture of the product obtained from the process is equally unnecessary.

Used as alkali carbonate and/or — chloride is preferably sodium carbonate and/or - chloride.

The reaction proceeds rapidly and quantitatively at room temperature. It is recommended to add the zirconium oxychloride to the chloride solution containing carbonate in small portions in order to avoid a foaming over of the reaction mixture due to the evolution of carbon dioxide. The quantitative course of the reaction may be assured by a short-term stirring after the addition of the last portions of zirconium oxychloride. The carbonated zirconium oxide hydrate formed at that time is obtained as a coarsely crystalline powder. It is easily settled out or deposited as a sediment, and may be filtered off and rinsed without difficulty.

The chloride-saturated mother liquor may be recycled.

The reaction on which the conversion is based may be expressed by the following equation:

$$2ZrOCl_2 \cdot 8 H_2O + 2 (NH_4)_2CO_3 \rightarrow Zr_2O_3(OH)_2 \cdot CO_2 \cdot 7 H_2O + 4 NH_4Cl + 8 H_2O + CO_2$$

In this reaction equation, as well as in the statements above, the initial assumption or premise is quite generally, that what is involved are not pure zirconium compounds, but instead the zirconium-hafnium compounds which occur in nature in association, wherein the hafnium portion is not separated, and also need not be separated.

It was surprising that in the known reaction with ammonium- and/or alkali carbonate, easily filterable gelatin-free reaction products are formed if the process is conducted in saturated ammonium- and/or alkali chloride solutions.

The inventive process will be further illustrated hereinbelow on the basis of the following examples:

EXAMPLE 1

1000 grams of ammonium chloride are dissolved in 2500 ml of water in a 5 liter beaker. The solution cools while dissolving occurs; it is then reheated to room temperature. Small amounts of ammonium chloride remain at the beaker bottom in order to insure that the solution is saturated with ammonium chloride. Introduced into this saturated solution are 230 grams of ammonium carbonate, which dissolve partially.

Added in portions to this reaction mixture at room temperature in the course of 1 hour are 600 grams of zirconium oxychloride·8 H$_2$O. The reaction mixture is subsequently stirred for an additional hour. Carbonated zirconium oxide hydrate is precipitated in coarsely crystalline form and washed chloride-free with 7 liters of water. The yield is practically quantitative.

EXAMPLE 2

950 grams of sodium chloride are dissolved in 2500 ml of water in a 5 liter beaker. The solution cools while dissolving occurs; it is then reheated to room temperature. Small amounts of sodium chloride remain at the beaker bottom in order to insure that the solution is saturated with sodium chloride. Added to this saturated solution are 230 grams of sodium carbonate, which dissolve partially.

Added in portions to this reaction mixture at room temperature in the course of 1 hour are 600 grams of zirconium oxychloride·8 H$_2$O. The reaction mixture is then stirred for an additional hour. Carbonated zirconium oxide hydrate is precipitated in coarsely crystalline form and washed chloride-free with 7 liters of water. The yield is practically quantitative.

It will be obvious to those skilled in the art that many modifications may be made within the scope of the present invention without departing from the spirit thereof, and the invention includes all such modifications.

What is claimed is:

1. A process for preparing carbonated zirconium oxide hydrate which comprises adding zirconium oxychloride · 8 H$_2$O to a saturated aqueous ammonium chloride and/or alkali chloride solution which, based upon zirconium oxychloride · 8 H$_2$O, contains at least equimolecular amounts of ammonium carbonate and/or alkali carbonate, separating the resulting precipitated reaction product, and washing said product chloride-free with water.

2. A process according to claim 1 in which the alkali chloride is sodium chloride.

3. A process according to claim 1 in which the alkali carbonate is sodium carbonate.

4. A process according to claim 1 in which said product is dried by passing CO$_2$ thereover at about room temperature.

* * * * *